C. O. ENGSTROM.
COUPLING.
APPLICATION FILED FEB. 15, 1916.
1,215,510.
Patented Feb. 13, 1917.
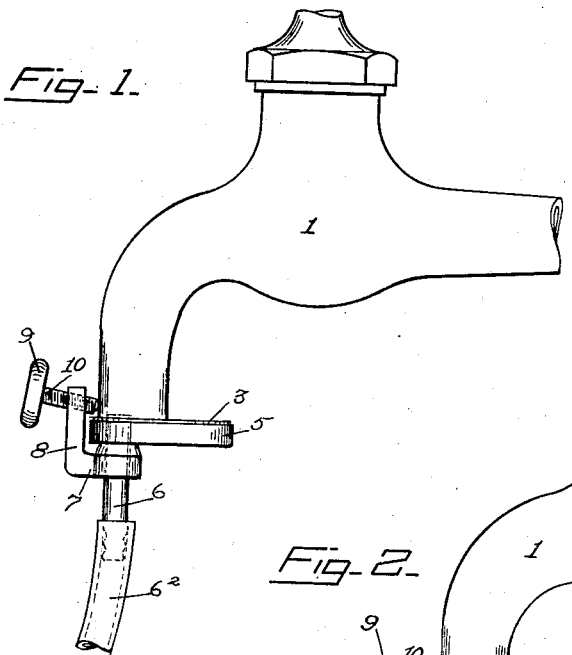
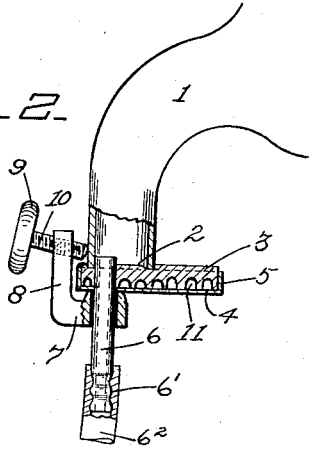
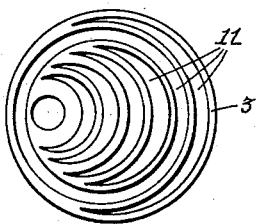
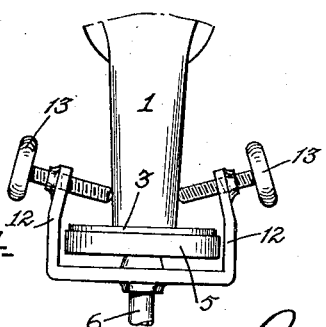
WITNESS
Wm. F. Drew.
INVENTOR
Carl O. Engstrom
BY
Acker & Totter
ATTORNEYS

UNITED STATES PATENT OFFICE.

CARL O. ENGSTROM, OF SACRAMENTO, CALIFORNIA.

COUPLING.

1,215,510. Specification of Letters Patent. Patented Feb. 13, 1917.

Application filed February 15, 1916. Serial No. 78,433.

*To all whom it may concern:*

Be it known that I, CARL O. ENGSTROM, a citizen of the United States, residing at Sacramento, in the county of Sacramento and State of California, have invented certain new and useful Improvements in Couplings, of which the following is a specification.

The present invention relates to improvements in couplings for attachment to faucets and the like, and the invention has for its principal objects to provide an apparatus which is capable of ready attachment to faucets or pipes of various sizes and shapes and to provide a type of device which does not require any special threading or fitting for the discharge outlets of the faucets.

By the employment of the present invention, hose may be connected to any suitable faucet or discharge pipe without the necessity of the pipe or faucet being of any particular size or configuration, and the present invention may be easily and quickly attached to and detached from the desired faucet or pipe end.

With the above mentioned and other objects in view the invention consists in the novel construction and combination of parts hereinafter described and illustrated in the accompanying drawings and pointed out in the claims hereto appended, it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a view in side elevation of an embodiment of my improved coupling.

Fig. 2 is a view in side elevation, partly in section, disclosing the manner of retaining the coupling member in position on the faucet.

Fig. 3 is an inverted plan view of a disk washer or packing.

Fig. 4 is a view of a modified form of structure.

Referring more particularly to the drawings, wherein like references indicate corresponding parts throughout the several views,—1 is a suitable faucet having an outlet 2, and against which is positioned a suitable disk washer or packing 3 of yieldable material, and which is seated on a suitable retaining plate 4 of any desired configuration and said plate is provided with an annular upstanding retaining flange 5 which retains the disk washer or packing in position on the plate. Extending upwardly through the circular plate 4, adjacent one side edge thereof and projecting a slight distance above the upper surface of the washer or packing 3, is a suitable discharge or outlet tube 6 open at its upper and lower ends, and the upper end of said tube, when the coupling is positioned over the faucet outlet, is adapted to project a slight distance into the interior of the faucet and lie adjacent the inner surface of the side wall thereof. Slidably mounted on said discharge or outlet tube 6 is a suitable retaining arm 7 bent upwardly at its outer end, as at 8, and extending a slight distance above the upper end of the discharge or outlet tube and in a plane substantially parallel therewith as in the drawings. The arm carries at its upper end an adjustable retaining screw 10, having a head 9 for grasping by the operator, and said adjusting screw is downwardly inclined toward the upper end of the discharge tube or outlet 6 and to impinge against the surface of the faucet at an angle to draw the plate 4 upwardly toward the lower edge of the faucet. If desired, the disk washer 3 may be provided in its under surface with suitable grooves or cut-outs 11 which insure a yieldable upper surface for the seating of the peripheral edge of the faucet outlets of the disk washer to maintain a water-tight joint between the same.

When positioning the coupling on the faucet, the operator inserts the upper end of the discharge or outlet tube 6 into the open end of the nozzle and in frictional contact with the inner wall surface thereof, then presses the disk washer or packing 3 upwardly against the peripheral edge of the faucet outlet 2, draws the retaining arm 7 upwardly until the same contacts with the base of the plate 4, and thence forces inwardly the retaining screw 10 which bites into the body of the faucet and tightly draws the upper end of the discharge outlet against the inner surface of the faucet. The downward inclination of the adjusting screw 9 draws the disk washer or packing 3 upwardly into contact with the peripheral edge of the faucet outlet 2 and maintains a watertight joint between the outlet and the coupling. The lower end of the outlet tube 6 may be annularly grooved, as at 6', to frictionally receive the hose connection 6².

By providing an enlarged retaining plate 4 and mounting thereon a disk washer 5, I am enabled to utilize the coupling in connection with faucets of various sizes and configurations, and by providing the retaining arm 7 and adjustably mounting the same relative to the plate 4, I am enabled to attach the coupling to faucets having various forms of surfaces adjacent their discharge points.

In Fig. 4 I have disclosed a modified form of device wherein a clamping arm is slidably mounted on the discharge outlet tube 6 and extends upwardly, as at 12, and both sides of the plate 4, and the upper ends of said arms, are inwardly bent and each carries a downwardly inclined attaching screw 13 which impinge against the nozzle at diametrically opposite sides thereof, and the tightening of the screws causes the retaining arm 7 to be drawn upwardly beneath the plate 4, causing the disk washer to be drawn tightly into contact with the peripheral edge of the faucet outlet, and maintain a water-tight joint between the faucet and coupling.

Having thus described my invention, what I claim is:—

1. A hose and faucet coupling consisting of a plate for positioning over the faucet outlet, a yieldable surface carried by said plate for contacting with the faucet outlet, an open-ended outlet pipe extending through said plate and yieldable surface and adapted at its upper end to project into said faucet outlet to contact with the inner surface thereof, an arm associated with said plate, and an adjustable clamping screw carried by said arm and downwardly inclined toward said plate for forcing against the outer surface of said faucet, said clamping means adapted to draw said yieldable surface upwardly against the peripheral edge of said faucet outlet and to draw the upper end of said outlet pipe tightly against the inner wall surface of said faucet.

2. A hose and faucet coupling consisting of a closure plate for positioning over the faucet outlet, means extended upwardly from said closure plate for projecting into the faucet outlet and for contacting with the inner wall surface thereof, a clamping means coöperating with said closure and for engaging the outer surface of said faucet adjacent said upwardly projecting means to draw the same tightly against the inner surface of the faucet and to also draw said closure upwardly against the peripheral edge of the faucet, and a fluid outlet extending through said closure plate.

3. A hose and faucet coupling consisting of a closure for positioning over the faucet outlet, means extended upwardly from said closure for projecting into the faucet outlet and for contacting with the inner wall surface thereof, an arm coöperating with said closure and extending above the same, an adjusting screw carried by said arm and downwardly inclined toward said closure for engaging the outer surface of the faucet adjacent said upwardly projecting means to draw the same tightly against the inner surface of the faucet and to draw said closure upwardly against the peripheral edge of the faucet, and a fluid outlet extended through said closure.

4. A hose and faucet coupling consisting of a plate having a yieldable surface for positioning over the faucet outlet, an open ended tubular outlet extended through said plate and projecting at its upper end above the yieldable surface adjacent the edge of the plate and said upper end adapted to contact with the inner surface of said faucet, an arm adjustably mounted on said tubular outlet beneath said plate and adapted to contact with the under surface thereof, said arm projecting above said plate and its upwardly projecting portion terminating in proximity of the tubular outlet, and an adjusting screw carried by said arm and inclined toward said plate and adapted to contact with the outer surface of said faucet to draw said upwardly projecting tubular portion against the inner surface thereof and to secure said plate in position on said faucet.

5. A hose and faucet coupling consisting of a plate provided with an upturned annular flange, a yieldable packing supported on said plate within said flange, said yieldable packing adapted for positioning over the faucet outlet, an open ended tubular outlet extended through said plate and yieldable packing adjacent one edge thereof and projecting at its opposite ends beyond said plate and packing, a substantially L-shaped arm slidably mounted on said tubular outlet below said plate and the upper portion thereof terminating in proximity to the upper end of the tubular outlet, and an adjustable clamping member carried by the said arm and downwardly inclined toward said plate, said screw adapted to contact with the outer surface of the faucet to draw the upwardly projecting end of said tubular outlet against the inner surface thereof and maintain a fluid-tight joint between the faucet outlet and said packing.

In testimony whereof I have signed my name to this specification in the presence of two subscribing witnesses.

CARL O. ENGSTROM.

Witnesses:
W. H. MERRILL,
ANNA E. MCNEALY.

Copies of this patent may be obtained for five cents each, by addressing the "Commissioner of Patents, Washington, D. C."